March 18, 1924.
F. G. WHITTINGTON
1,487,499
INSTRUMENT DRIVING CONNECTION FOR MOTOR VEHICLES
Filed March 17, 1922    2 Sheets-Sheet 2
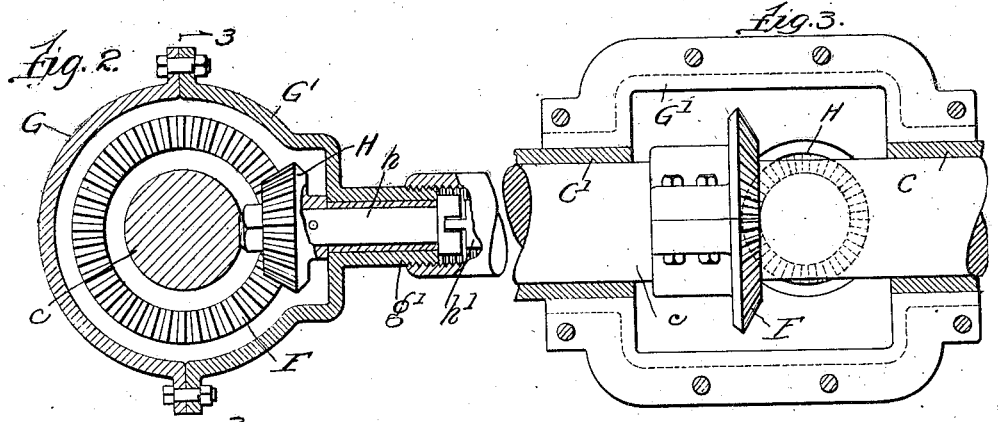
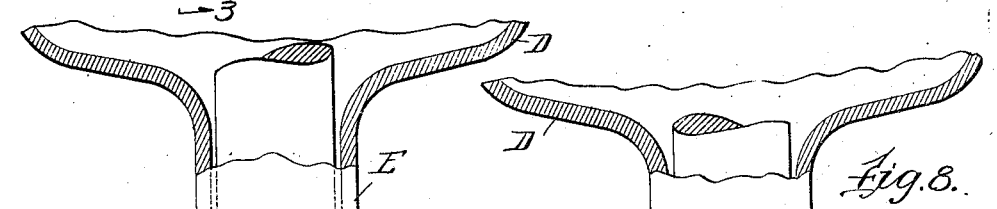
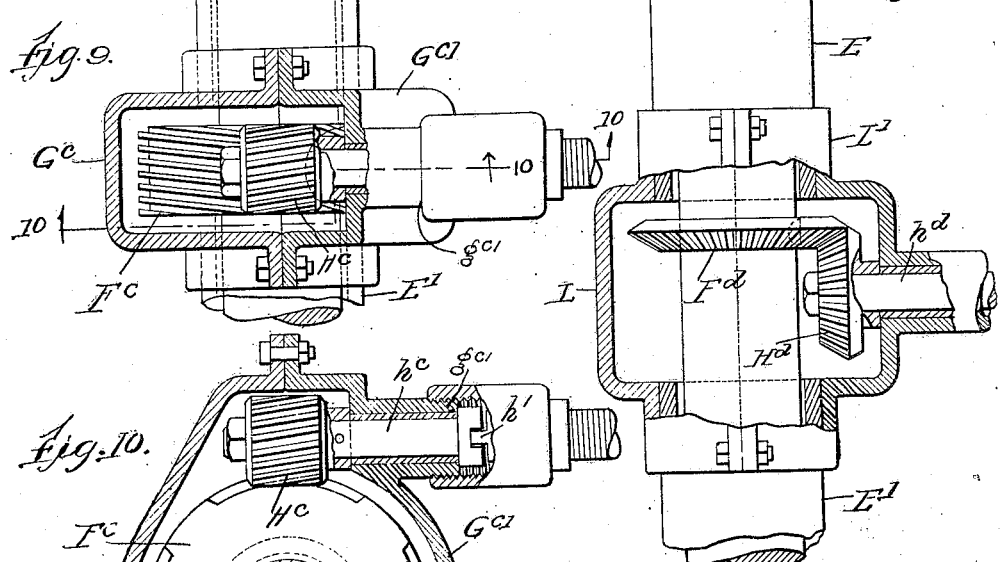
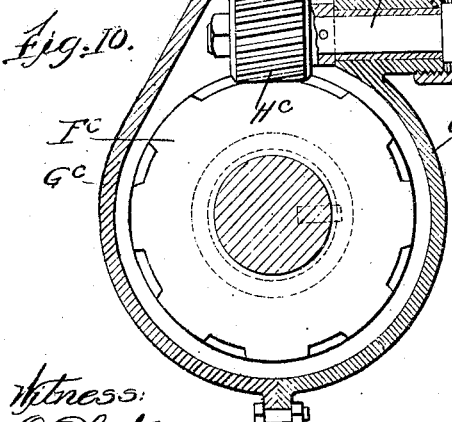
Inventor:
Frederick G. Whittington
by Burton & Burton
his Atty's
Witness:

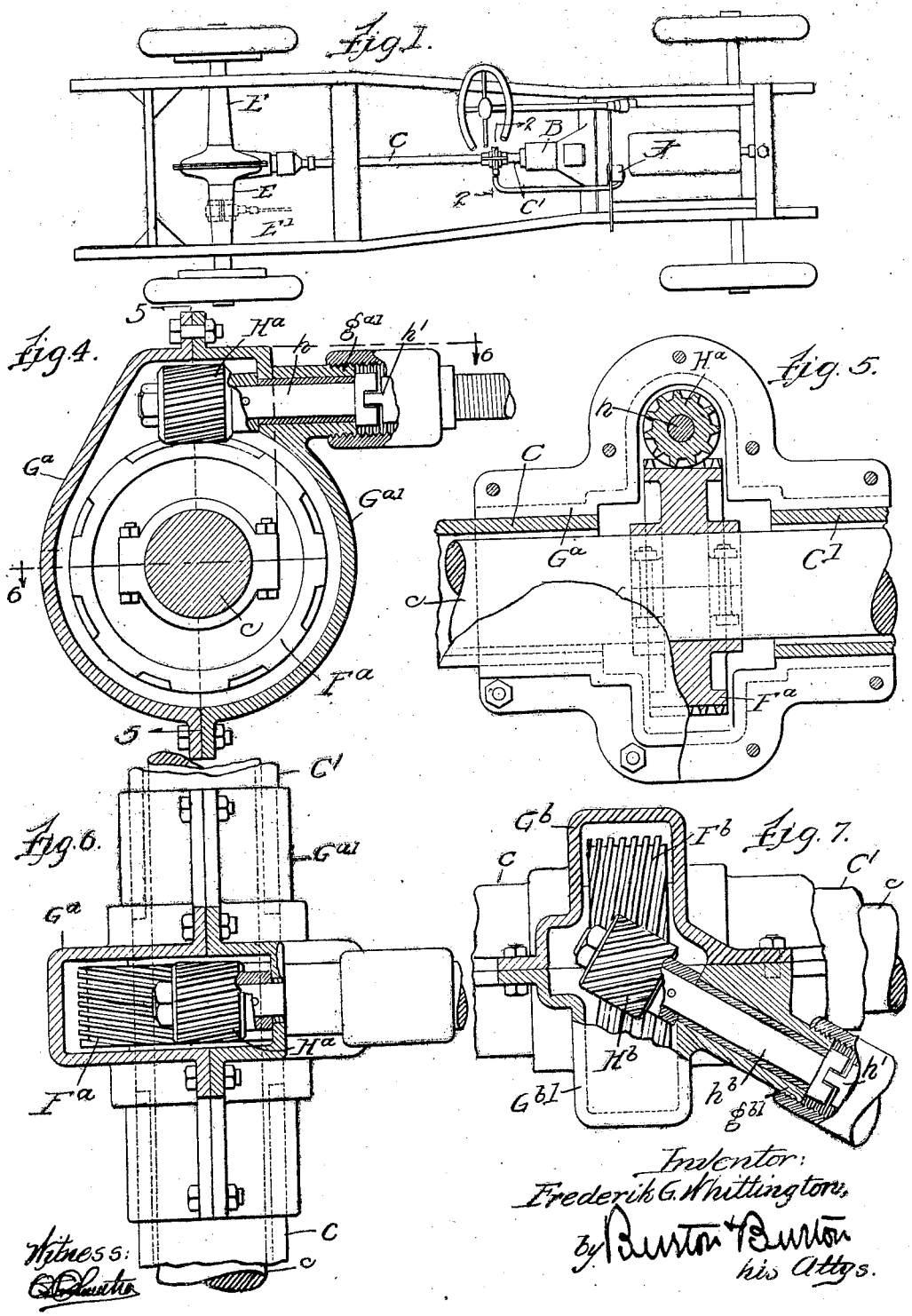

Patented Mar. 18, 1924.

1,487,499

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

INSTRUMENT-DRIVING CONNECTION FOR MOTOR VEHICLES.

Application filed March 17, 1922. Serial No. 544,644.

*To all whom it may concern:*

Be it known that I, FREDERIK G. WHITTINGTON, a citizen of the United States, residing in Evanston, in the county of Cook and State of Illinois, have invented certain new and useful Improvements in Instrument-Driving Connections for Motor Vehicles, of which the following is a specification, reference being had to the accompanying drawings, forming a part thereof.

The purpose of this invention is to provide an improved construction and arrangement of driving connection from operating parts of a motor vehicle mechanism to an instrument carried by the vehicle for indicating or recording the operation of the mechanism such as a speedometer, odometer, or mileage signal. It consists in the elements and features of construction shown and described, as indicated in the claims.

In the drawings:—

Figure 1 is a diagrammatic or conventional plan view of the chassis and operating parts of the mechanism of a motor vehicle equipped with this invention which is shown thereon conventionally or in outline merely for indicating its position with relation to the mechanism of the vehicle.

Figure 2 is a section at the line 2—2 on Figure 1.

Figure 3 is a section at the line 3—3 on Figure 2.

Figure 4 is a view similar to Figure 2, showing a modified form of intermeshing gear for transmission of motions from the propeller shaft to the instrument.

Figure 5 is a section at the line 5—5 on Figure 4.

Figure 6 is a section at the line 6—6 on Figure 4.

Figure 7 is a view similar to Figure 6 showing a second modification.

Figure 8 is a partially sectional plan view of a portion of the rear drive wheel casing and axle having the driving connection embodying the invention associated with said axle, the section being made axially with respect to the axle and driven shaft of the device.

Figure 9 is a partially sectional plan view of the same parts as shown in Figure 8 but showing a modification consisting in the substitution of spiral for direct bevel gears, the section being made at a plane parallel to the rear axle, axial with respect to the driven shaft.

Figure 10 is a section at the line 10—10 on Figure 9.

In the drawings the speedometer or other instrument to be operated is shown at A. B is the transmission casing of the vehicle mechanism. C, C¹ is the propeller shaft casing. D is a differential casing. E is the rear axle casing. *c* is the propeller shaft. When the elements constituting this invention are associated with the propeller shaft, the propeller shaft casing is parted at some point in its length between the transmission casing and the differential casing, and the two parts, C, C¹, are longitudinally spaced apart and coupled together by a cross-shaped coupling housing, desirably formed in two parts, G and G¹, which not only constitute a coupling for the two parts of the propeller casing, but also a housing for the intermeshing gear of the drive connection. In Figures 2 and 3 there is shown what may be regarded as the most obvious form of drive, consisting of a two-piece bevel gear, F, on the propeller shaft, parted axially of said shaft to facilitate its application laterally to the shaft at the desired location, and a bevel pinion, H, on the driven shaft, *h*, which is journaled in the coupling-housing, G, G¹, and specifically, in the member, G¹, of said coupling-housing, extending off at any desired angle (as shown in Figures 2 and 3, at right angles) to the propeller shaft, either horizontally, vertically or in an inclined direction, as most desirable or convenient for extending the flexible shaft to the speedometer with the least curvature or deflection from the direct course. It will be seen that the adjustment of the coupling, G, G¹, about the axis of the propeller shaft casing can be made as desired for directing the driven shaft, *h*, horizontally, vertically or in any intermediate inclination. It will be understod that by parting the coupling-housing, G, G¹, at a plane containing the axis of the propeller shaft and transverse to the axis of the driven shaft, said coupling-housing with the driven shaft therein, can be applied to the propeller shaft casing and shaft, with the driving gear on the propeller shaft already secured in position thereon between the two parted members of the propeller shaft casing. The two parts, G, G¹, of the coupling housing will be suitably constructed for rigidly gripping the two parted members, C, C¹, of the propeller casing in the clamping together of said two members, G, G¹, of the coupling-housing; and any additional means thought necessary may be provided for making the coupling rigid with the two members of the propeller casing.

In Figures 4, 5 and 6, the intermeshing gears on the propeller shaft and the driven shaft respectively, are of the spiral type, and the detail formation of the coupling-housing members is suitably modified, particularly in view of the fact that for a spiral gear drive the two shafts are not in the same plane, the axis of the one shaft crossing the other shaft, the two bearings being offset laterally from each other. Further detail description of this modification will be unnecessary, corresponding parts being identified by corresponding letters, $G^a$, $G^{a1}$, being the two members of the coupling-housing; $F^a$ and $H^a$, being respectively the driving gear of the propeller shaft and the driven gear or pinion on the driven shaft, both of the spiral type, the gear $F^a$ being a two-piece gear parted transversely of the shaft for lateral application thereto.

In Figure 7 is shown a second modification, the driven shaft extending off obliquely with respect to the propeller shaft, as will frequently be found convenient for directing the flexible shaft connection to the speedometer as nearly as possible in a straight course. In these figures the corresponding parts are correspondingly lettered, the two members of the cross-shaped coupling housing being designated, $G^b$, $G^{b1}$, the intermeshing gears on the propeller shaft and driven shaft, respectively, being $F^b$ and $H^b$.

In Figure 8 this type of drive connection is shown applied to the rear axle, and the rear axle casing. The rear axle casing is parted in the same manner as shown in respect to the propeller casing in the previous figure, the two parts, E, E¹, being spaced apart and coupled together by the cross shaped fittings, L, L¹, which are clamped together and onto the parted members of the axle casing, in the same manner as shown with respect to the coupling housing, G, G¹, of the propeller shaft casing shown in the previous figures. In the form shown in Figure 8, the intermeshing gears on the axle and the driven shaft are bevel gears, and the driven shaft trends off substantially horizontally forward from the rear axle.

In Figures 9 and 10 there is shown a modification of the rear axle drive, corresponding to the modification of the propeller shaft drive which is shown in Figures 4, 5 and 6, that is to say, having spiral gears, $F^c$ and $H^c$, on the axle and driven shaft respectively, the cross-shaped coupling housing having its two members offset laterally from each other instead of directly intersecting, said two members being designated respectively, $G^c$ and $G^{c1}$.

In all the forms of this drive employing the cross-shaped coupling housing, the member of this coupling housing which has the journal bearing for the driven shaft, has said journal bearing provided with a terminal adapted for securement thereto of the casing of a flexible shaft, as by being exteriorly threaded, as shown at $g^1$, $g^{a1}$, $g^{b1}$, and $g^{c1}$, in the several forms shown respectively in Figures 2, 4, 7, and 10. In all of these forms also the driven shaft, $h$, has its outer end adapted for driving coupling with the rotary member of a flexible shaft in the customary manner shown at $h^1$.

I claim:—

1. In an automobile, a construction for applying to a propeller shaft which is housed throughout its length, and at an intermediate point in said length, a gear for transmitting driving power from said shaft to an accessory instrument, consisting in the combination with such shaft of a housing transversely severed and having the severed ends of the parts spaced apart for a distance sufficient to accommodate a gear on said shaft, such gear comprising a plurality of members severed axially of the shaft and secured together clamping the shaft; a coupling joining rigidly the two severed members of the shaft housing, said coupling being enlarged over the interval between the spaced-apart ends of the shaft housing to form a chamber housing said gear, said coupling comprising two members severed axially and secured together clamping said spaced-apart ends of the shaft housing, said housing coupling having a journal bearing for a driven shaft, a shaft journaled in said bearing, and a gear on said shaft within the coupling chamber meshing with the first mentioned gear therein.

2. In the construction defined in claim 1, foregoing, the journal bearing for the driven shaft being contained wholly in one member of the propeller shaft housing coupling.

3. In the construction defined in claim 1, foregoing, the journal for the driven shaft being axially transverse to the propeller shaft.

4. In the construction defined in claim 1, foregoing, the journal bearing for the driven shaft being offset laterally from the propeller shaft.

5. In the construction defined in claim 1, foregoing, the journal bearing for the driven shaft being axially transverse to and offset laterally from the propeller shaft.

6. In the construction defined in claim 1, foregoing, the journal bearing for the driven shaft being axially oblique to the vertical plane of the propeller shaft axis.

In testimony whereof, I have hereunto set my hand at Chicago, Illinois, this 14th day of March, 1922.

FREDERIK G. WHITTINGTON.